US006976502B1

(12) United States Patent
Bibow et al.

(10) Patent No.: US 6,976,502 B1
(45) Date of Patent: Dec. 20, 2005

(54) TANK HOSE HANDLING SYSTEM

(76) Inventors: Warren A. Bibow, 14 Merrill Pl., Huntington, NY (US) 33743; Christopher W. Bibow, 14 Merrill Pl., Huntington, NY (US) 33743

( * ) Notice: Subject to any disclaimer, the term of this patent is extended or adjusted under 35 U.S.C. 154(b) by 287 days.

(21) Appl. No.: 10/678,845

(22) Filed: Oct. 3, 2003

Related U.S. Application Data

(60) Provisional application No. 60/473,713, filed on May 29, 2003.

(51) Int. Cl.[7] ................................................ F16L 3/00

(52) U.S. Cl. .................. 137/343; 137/355.16; 248/75; 248/79

(58) Field of Search ............................... 137/899, 343; 248/75, 79

(56) References Cited

U.S. PATENT DOCUMENTS 517,293 A * 3/1894 Powell ...................... 220/735
1,746,151 A * 2/1930 Goldman .................... 248/79
2,490,839 A * 12/1949 Shaffer et al. ............... 48/190
2,520,591 A * 8/1950 Wilmarth ................... 137/595
2,636,704 A * 4/1953 Norberg ..................... 248/79
2,881,757 A * 4/1959 Haverland ............ 128/200.14
3,050,801 A * 8/1962 Downey .................... 285/244
3,675,275 A * 7/1972 Arblaster .................... 248/75
5,042,525 A * 8/1991 Clark ........................ 137/381

* cited by examiner

*Primary Examiner*—A. Michael Chambers
(74) *Attorney, Agent, or Firm*—Edward P. Dutkiewicz

(57) ABSTRACT

A tank has an enlarged cylindrical lower section a small tubular upper section. A hemispherical middle section is provided between the lower and upper sections. A gas dispensing hose has an inner end attached to the upper section and an outer free end. A support assembly has an interior component with an inner long leg and an outer long leg with an inner bend there between. The support assembly also has an exterior component with an inner short leg and an outer short leg with an outer bend there between. The support assembly also has a lateral leg integrally formed with the upper end of the inner long leg and an outer curvature removably coupled to the tubular upper section adjacent to the semi-hemispherical section.

20 Claims, 5 Drawing Sheets

FIG 14
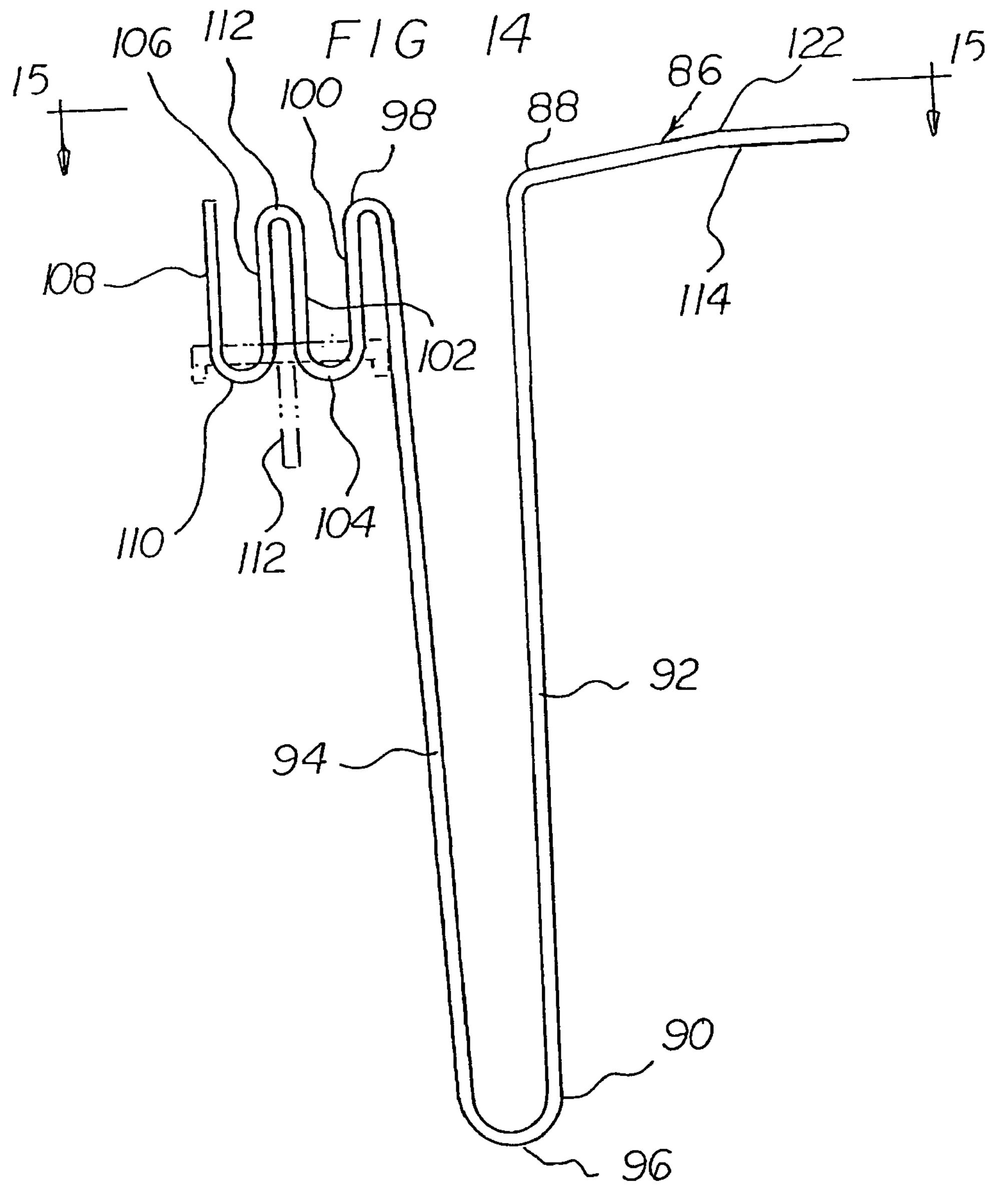
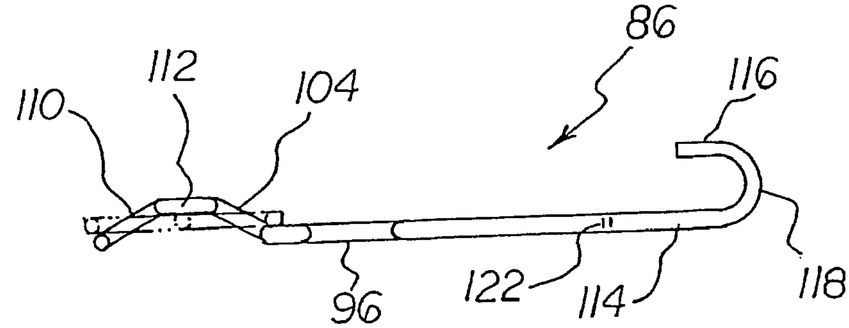
FIG 15

TANK HOSE HANDLING SYSTEM

RELATED APPLICATION

The present application is based upon now abandoned Provisional Patent Application Ser. No. 60/473,713 filed May 29, 2003, the subject matter of which is incorporated herein by reference.

BACKGROUND OF THE INVENTION

1. Field of the Invention

The present invention relates to a tank hose handling system and more particularly pertains to supporting a hose and associated components in operative proximity to a gas tank in a safe and convenient manner.

2. Description of the Prior Art

The use of hose handling methods and apparatuses is known in the prior art. More specifically, hose handling methods and apparatuses previously devised and utilized for the purpose of handling hoses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,725,208 issued Nov. 29, 1955 to Bova discloses a tank hose clamp. U.S. Pat. No. 3,240,407 issued Mar. 15, 1966 to Boak discloses a guard, carrier and hose rack. U.S. Pat. No. 4,294,481 issued Oct. 13, 1981 to Pearl discloses a gas cylinder carrier. Lastly, U.S. Pat. No. 4,486,044 issued Dec. 4, 1984 to Gordon discloses an apparatus for supporting and transporting a gas cylinder.

While these devices fulfill their respective, particular objectives and requirements, the aforementioned patents do not describe a tank hose handling system that allows supporting a hose and associated components in operative proximity to a gas tank in a safe and convenient manner.

In this respect, the tank hose handling system according to the present invention substantially departs from the conventional concepts and designs of the prior art, and in doing so provides an apparatus primarily developed for the purpose of supporting a hose and associated components in operative proximity to a gas tank in a safe and convenient manner.

Therefore, it can be appreciated that there exists a continuing need for a new and improved tank hose handling system which can be used for supporting a hose and associated components in operative proximity to a gas tank in a safe and convenient manner. In this regard, the present invention substantially fulfills this need.

SUMMARY OF THE INVENTION

In view of the foregoing disadvantages inherent in the known types of hose handling methods and apparatuses now present in the prior art, the present invention provides an improved tank hose handling system. As such, the general purpose of the present invention, which will be described subsequently in greater detail, is to provide a new and improved tank hose handling system and method which has all the advantages of the prior art and none of the disadvantages.

To attain this, the present invention essentially comprises a tank for containing and dispensing gas. The tank may be any of a plurality of sizes with the support assembly being sized for functioning with the particular tank. The tank has an enlarged cylindrical lower section and a small tubular upper section. A hemispherical middle section is provided between the upper and lower sections. A common vertical axis is provided through the sections.

A gas dispensing hose is provided. The gas dispensing hose has an inner end. The upper end is attached to the upper section. The gas dispensing hose has an outer free end. A plurality of operational components are attached, as for example, a torch, spark lighter, valve key, safety goggles/face shield, and any other of a wide variety of usage accessories.

Next provided is a support assembly. The support assembly has an interior component. The interior component has an inner long leg and an outer long leg. An inner bend is provided between the inner and outer legs. The support assembly also has an exterior component. The exterior component has an inner short leg and an outer short leg. An outer bend is provided between the inner and outer legs. The upper end of the outer long leg and the upper end of the inner short leg are integrally formed. The support assembly also has a lateral leg. The lateral leg is integrally formed with the upper end of the inner long leg and an outer curvature. The lateral leg is removably coupled to the tubular upper section adjacent to the semi-hemispherical section. The support assembly is formed from a single piece of material formed to the desired shape. The support assembly is formed of a material, preferably a metal such as steel or a plastic or any combination thereof. The material is of a thickness, preferably a diameter of between about ⅛ inch and ¾ inch, to allow for limited flexibility. The exterior component, the interior component, the lateral leg and the axis of the tank are in a common plane.

Provided last is a lower strap, an optional feature. The lower strap encompasses the inner long leg adjacent to the bottom thereof. The cylindrical lower section is adjacent to the lower extent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tank hose handling system which has all of the advantages of the prior art hose handling methods and apparatuses and none of the disadvantages.

It is another object of the present invention to provide a new and improved tank hose handling system which may be easily and efficiently manufactured and marketed.

It is further an object of the present invention to provide a new and improved tank hose handling system which is of durable and reliable constructions.

An even further object of the present invention is to provide a new and improved tank hose handling system which is susceptible of a low cost of manufacture with regard to both materials and labor, and which accordingly is then susceptible of low prices of sale to the consuming public, thereby making such tank hose handling system economically available to the buying public.

Even still another object of the present invention is to provide a tank hose handling system for supporting a hose and associated components in operative proximity to a gas tank in a safe and convenient manner.

Lastly, it is an object of the present invention to provide a new and improved tank hose handling system. A tank has an enlarged cylindrical lower section a small tubular upper section. A hemispherical middle section is provided between the lower and upper sections. A gas dispensing hose has an inner end attached to the upper section and an outer free end. A support assembly has an interior component with an inner long leg and an outer long leg with an inner bend there between. The support assembly also has an exterior component with an inner short leg and an outer short leg with an outer bend there between. The support assembly also has a lateral leg integrally formed with the upper end of the inner long leg and an outer curvature removably coupled to the tubular upper section adjacent to the semi-hemispherical section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 14 is a front elevation of yet another alternate embodiment of the invention.

FIG. 15 is a plan view taken along line 15—15 of FIG. 14.

The same reference numerals refer to the same parts throughout the various Figures.

DESCRIPTION OF THE PREFERRED EMBODIMENT

Figure 1:
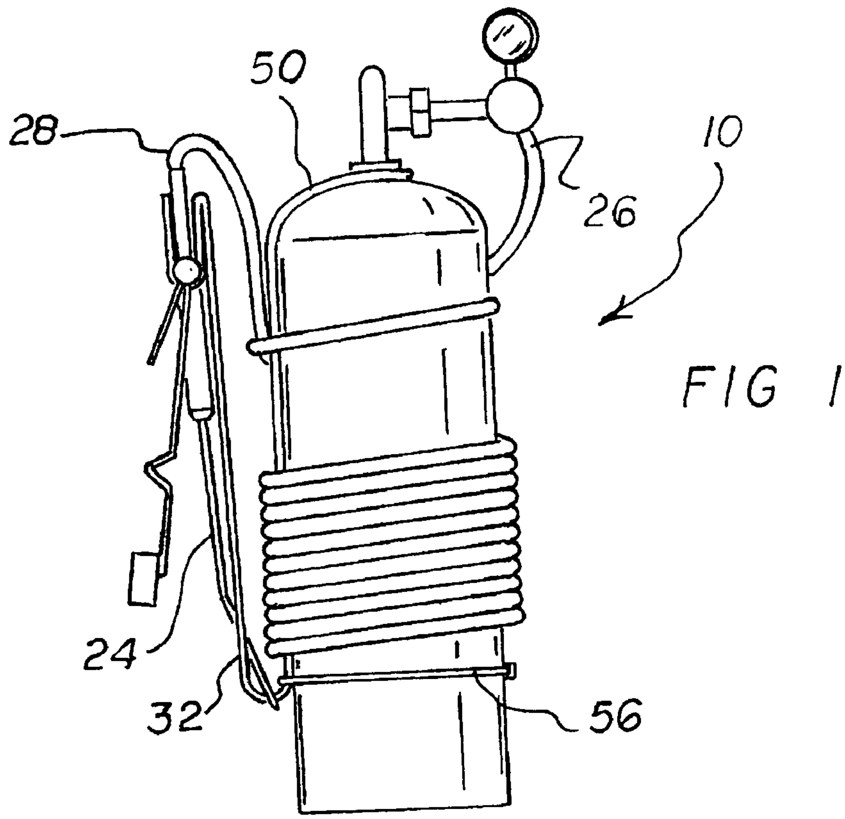
FIG. 1 is a front elevational view of a tank hose support system constructed in accordance with the principles of the present invention.
Figure 2:
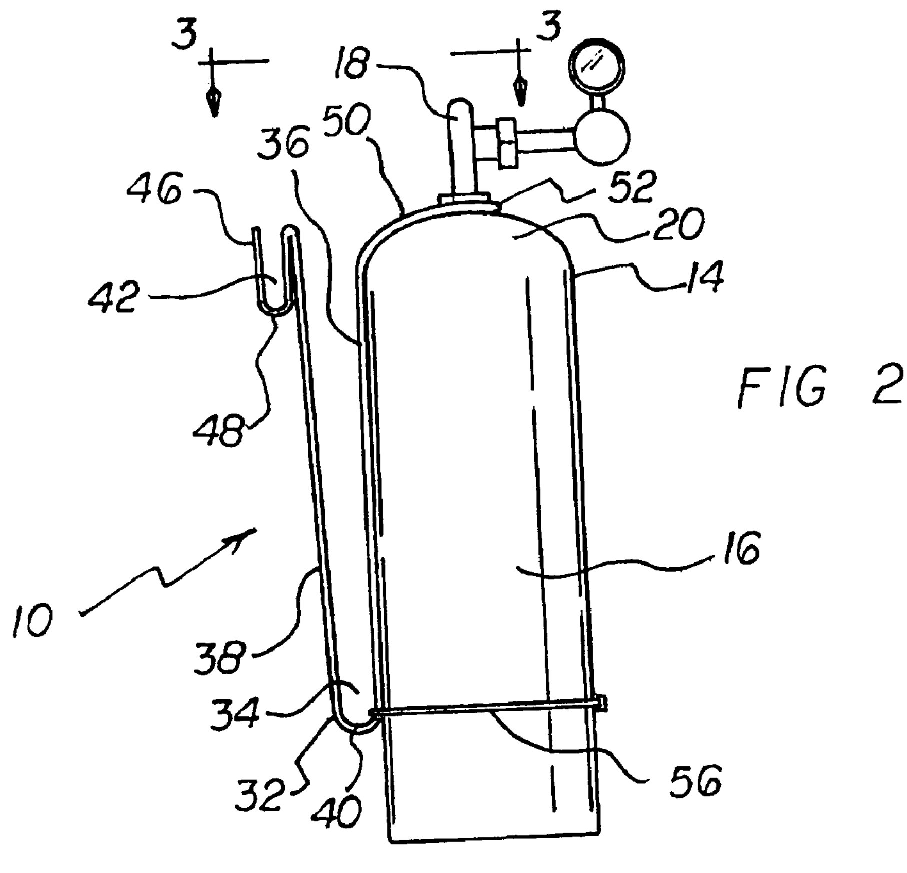
FIG. 2 is a side elevational view of the system of FIG. 1 but with the hose removed.

With reference now to the drawings, and in particular to FIG. 1 thereof, the preferred embodiment of the new and improved tank hose handling system embodying the principles and concepts of the present invention and generally designated by the reference numeral 10 will be described.

The present invention, the tank hose handling system 10 is comprised of a plurality of components. Such components in their broadest context include a tank, a gas dispensing hose and a support assembly. Such components are individually configured and correlated with respect to each other so as to attain the desired objective.

First provided is a tank 14 for containing and dispensing gas. The tank has an enlarged cylindrical lower section 16 and a small tubular upper section 18. A hemispherical middle section 20 is provided between the upper and lower sections. A common vertical axis is provided through the sections.

A gas dispensing hose 24 is provided. The gas dispensing hose has an inner end 26. The upper end is attached to the upper section. The gas dispensing hose has an outer free end 28. A plurality of operational components are attached, as for example, a torch, spark lighter, etc.

Next provided is a support assembly 32. The support assembly has an interior component 34. The interior component has an inner long leg 36 and an outer long leg 38. An inner bend 40 is provided between the inner and outer legs. The support assembly also has an exterior component 42. The exterior component has an inner short leg 44 and an outer short leg 46. An outer bend 48 is provided between the inner and outer legs. The upper end of the outer long leg and the upper end of the inner short leg are integrally formed. The support assembly also has a lateral leg 50. The lateral leg is integrally formed with the upper end of the inner long leg and an outer curvature 52. The lateral leg is removably coupled to the tubular upper section adjacent to the semi-hemispherical section. The support assembly is formed from a single piece of material formed to the desired shape. The support assembly is formed of a material, preferably a metal such as steel or a plastic. The material is of a thickness, preferably a diameter of between about ⅛ inch and ¾ inch, to allow for limited flexibility. The exterior component, the interior component, the lateral leg and the axis of the tank are in a common plane.

Provided last is a lower strap 56. The lower strap encompasses the inner long leg adjacent to the bottom thereof. The cylindrical lower section is adjacent to the lower extent.

Figure 3:
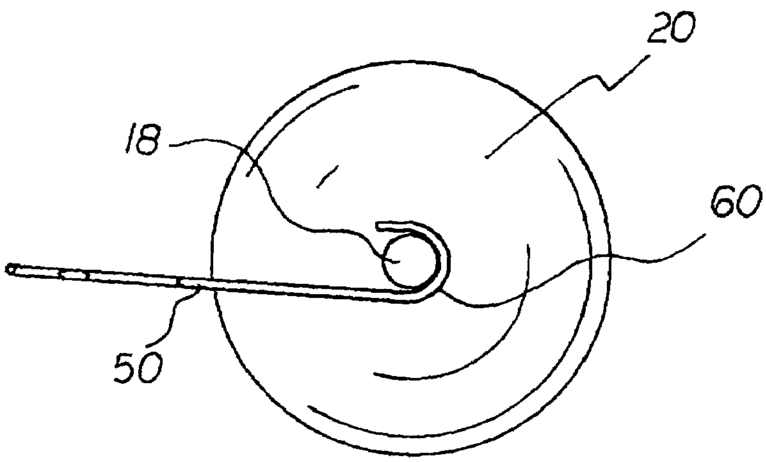
FIG. 3 is a plan view of the system of the prior Figures taken along line 3—3 of FIG. 2.

In an alternate embodiment of the present invention the outer curvature 60 is C-shaped. Note FIG. 3.

Figure 4:
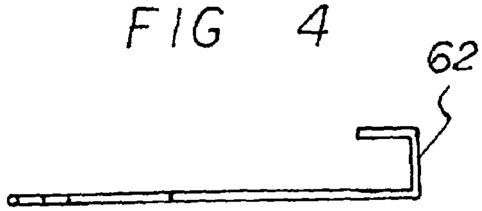
FIGS. 4 through 9 are plan views of the support assembly illustrating alternate embodiments of the invention.

In another alternate embodiment of the present invention the outer curvature 62 is shaped with three flat sides and an open side. Note FIG. 4.

Figure 5:
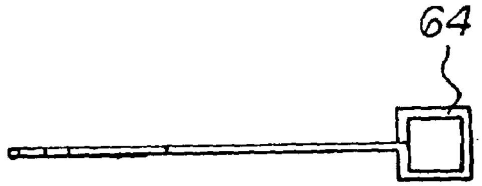

In still another alternate embodiment of the present invention the outer curvature 64 is rectangular-shaped. Note FIG. 5.

Figure 6:
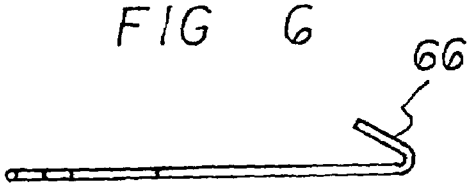

In another alternate embodiment of the present invention the outer curvature 66 is V-shaped. Note FIG. 6.

Figure 7:
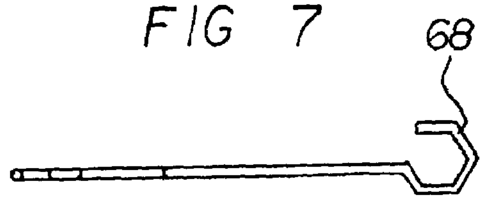

In another alternate embodiment of the present invention the outer curvature 68 is shaped with five flat sides and one open side. Note FIG. 7.

Figure 8:
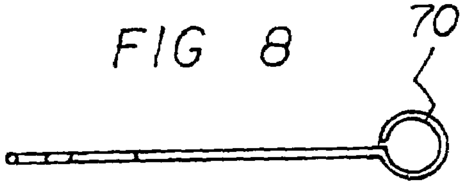

The outer curvature 70 in another alternate embodiment of the present invention is in a circular shape. Note FIG. 8.

Figure 9:
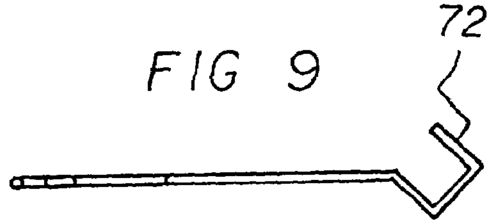

Another alternate embodiment of the present invention has the outer curvature 72 in a diamond-shape with one open side. Note FIG. 9.

Figure 10:
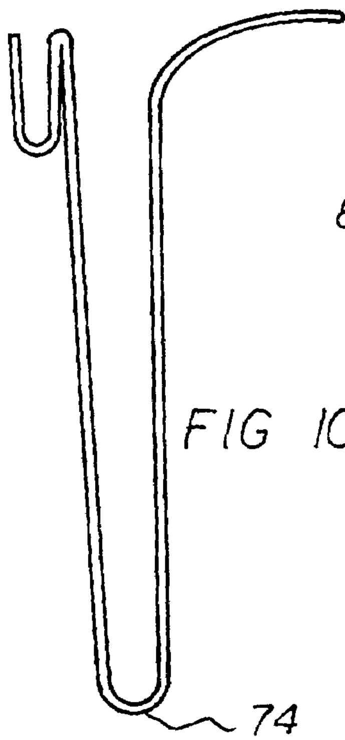
FIGS. 10 through 13 are side elevation views of support assemblies constructed in accordance with alternate embodiments of the invention.

In another alternate embodiment of the present invention the inner bend 74 is U-shaped. Note FIG. 10.

Figure 11:
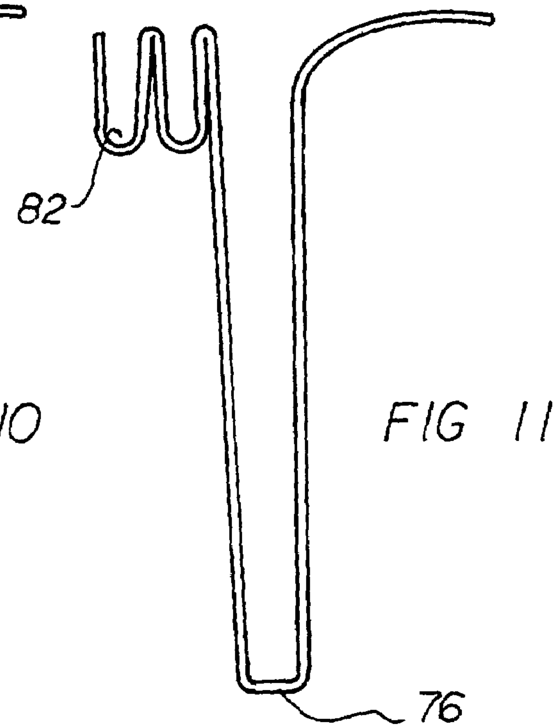

In an alternate embodiment of the present invention the inner bend 76 is shaped as a rectangle with an open top. Note FIG. 11.

Figure 12:
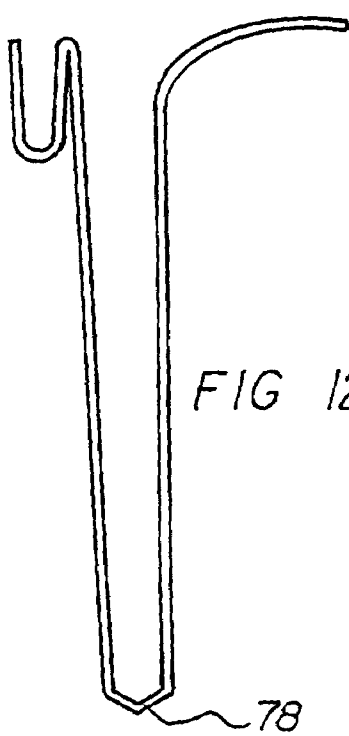

The inner bend 78 is shaped as a broad V in another alternate embodiment of the present invention. Note FIG. 12.

Figure 13:
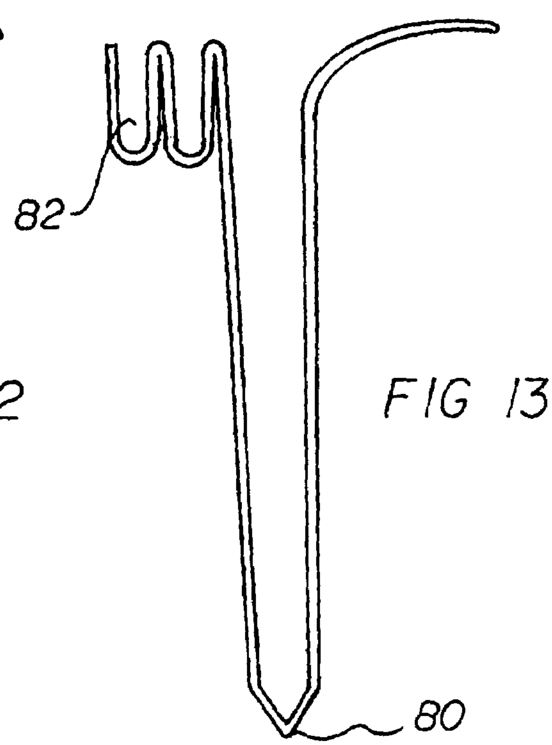

In still another alternate embodiment of the present invention the inner bend 80 is shaped as an arrow V. Note FIG. 13.

In yet another alternate embodiment of the present invention the system includes a second exterior component 82. The second exterior component has an inner short leg and an outer short leg. A supplemental outer bend is provided between the inner and outer legs. The upper end of the outer short leg of the first mentioned exterior component and the upper end of the inner short leg of the second exterior component are integrally formed. The first mentioned exterior component and the second exterior component and the interior component and the lateral leg are in a common plane.

FIGS. 14 and 15 illustrate another alternate embodiment of the invention. In such embodiment, the tank hose handling system 86 comprises, as in the prior embodiments, a tank having an enlarged cylindrical lower section and a small tubular upper section with a hemispherical middle section there between. The system also includes, as in the prior embodiments, a gas dispensing hose having an inner end attached to the upper section and an outer free end. The system also includes a modified support assembly 88.

The modified support assembly has an interior component 90 with an inner long leg 92 and an outer long leg 94 with an inner bend 96 there between. The support assembly also has an exterior component 98 with an inner short leg 100 and an outer short leg 102 with an outer lower bend 104 there between.

Outwardly of the outer short leg and parallel therewith are a third short leg 106 and a fourth short leg 104 with a second outer lower bend 110 there between. An upper outer bend 112 secures the outer short leg to the third short leg.

The upper outer bend 112 and its legs 102, 106 are parallel with, but offset from, the inner bend 96 and its legs 92, 94. The outer lower bend 104 and second outer lower bend 110 along with their legs are at angles with respect to the upper outer bend 112 and positioned there between. This arrangement provides an arrangement for holding a T-valve wrench or the like.

In this embodiment, the bend between the lateral extension 114 and the inner long leg 92 is a sharp, essentially 90 degree bend. In prior embodiments, such bend was a smooth curve approximating the adjacent curvature of the tank or the tank valve. Additionally, the bend between the exterior component 98 and the exterior long leg 94 has a radius of curvature only slightly less than the radius of curvature of the outer lower bend 104. In prior embodiments, such bend had a radius of curvature significantly less than the radius of curvature of the outer lower bend 104.

The support assembly also has a lateral leg 114 integrally formed with the upper end of the inner long leg and with a remote end 116 and an outer curvature 118. The lateral leg, remote end and outer curvature are removably coupled to the tubular upper section adjacent to the semi-hemispherical section.

Figure 16:
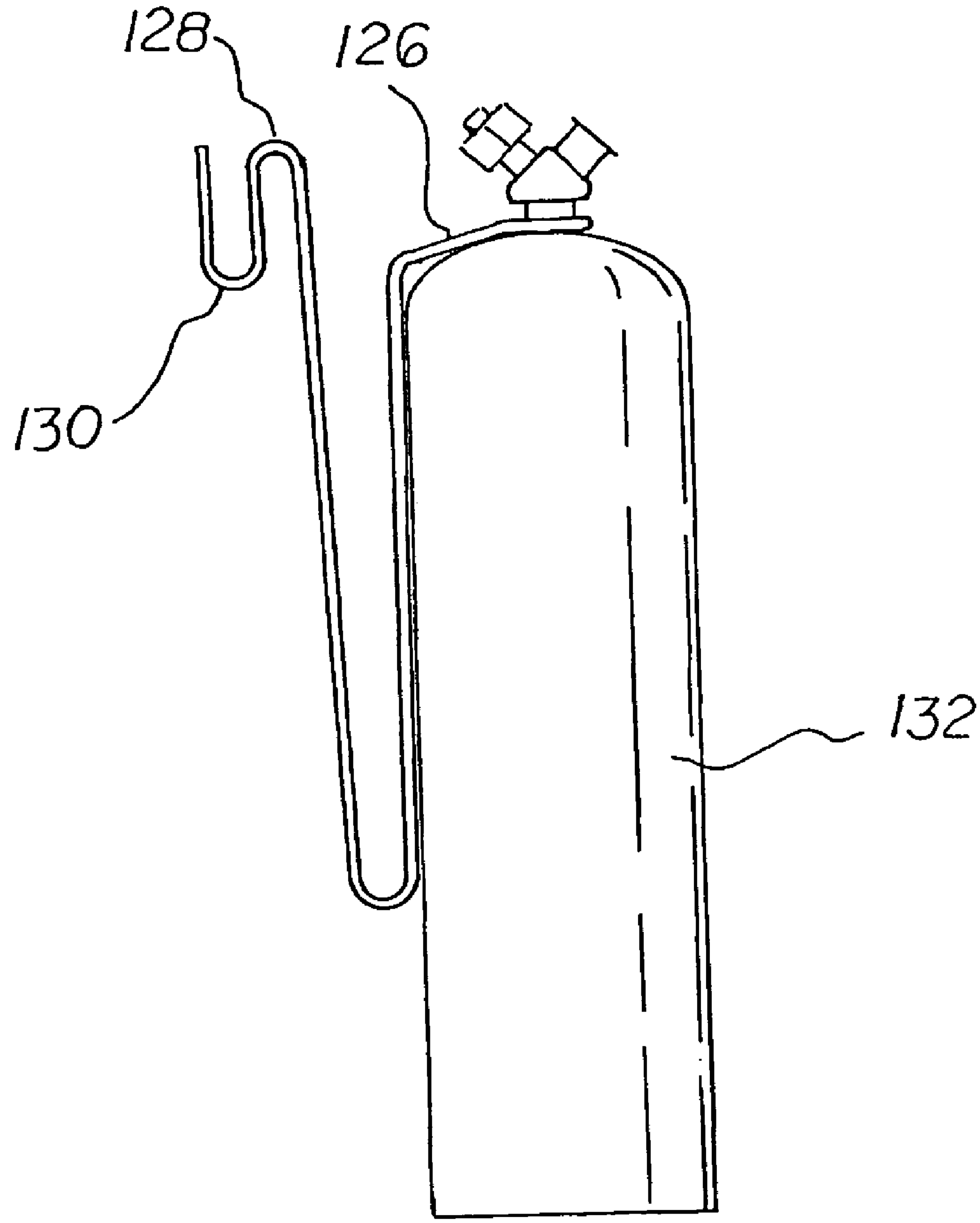
FIG. 16 is a front elevation of a final alternate embodiment of the invention.

FIG. 16 illustrates a final alternate embodiment of the invention. In such embodiment, the tank hose handling system comprises, as in the prior embodiments, a tank 132 having an enlarged cylindrical lower section and a small tubular upper section with a hemispherical middle section there between. The system also includes, as in the prior embodiments, a gas dispensing hose having an inner end attachable to the upper section and an outer free end. The system also includes a modified support assembly 126.

The modified support assembly has an interior component with an inner long leg and an outer long leg with an inner bend there between. The support assembly also has an exterior component with an inner short leg and an outer short leg with an outer lower bend 130 there between. An upper bend 128 couples the inner short leg and the outer long leg. In this embodiment, the upper bend 128 is at an elevation above the lateral leg whereas in the prior embodiments, the upper bend is at an elevation below the lateral leg.

The support assembly attaches to the tank either by securing around the tank neck or by securing around the valve system/regulator system commonly employed by users. Note FIGS. 1, 2, 3 and 16.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tank hose handling system comprising:

a tank having an enlarged cylindrical lower section and a small tubular upper section with a hemispherical middle section there between;

a gas dispensing hose having an inner end attached to the upper section and an outer free end;

a support assembly having an interior component with an inner long leg and an outer long leg with an inner bend there between, the support assembly also having an exterior component with an inner short leg and an outer short leg with an outer bend there between, the support assembly also having lateral leg integrally formed with the upper end of the inner long leg and an outer curvature removably coupled to the tubular upper section adjacent to the semi-hemispherical section.

2. The system as set forth in claim 1 and further including a lower strap encompassing the inner long leg adjacent to the bottom thereof and the cylindrical lower section adjacent to the lower extent.

3. The system as set forth in claim 1 wherein the outer curvature is C-shaped.

4. The system as set forth in claim 1 wherein the outer curvature is shaped with three flat sides and an open side.

5. The system as set forth in claim 1 wherein the outer curvature is rectangular-shaped.

6. The system as set forth in claim 1 wherein the outer curvature is V-shaped.

7. The system as set forth in claim 1 wherein the outer curvature is shaped with five flat sides and one open side.

8. The system as set forth in claim 1 wherein the outer curvature is in a circular shape.

9. The system as set forth in claim 1 wherein the outer curvature is diamond-shaped with one open side.

10. The system as set forth in claim 1 wherein the inner bend is U-shaped.

11. The system as set forth in claim 1 wherein the inner bend is shaped as a rectangle with an open top.

12. The system as set forth in claim 1 wherein the inner bend is shaped as a broad V.

13. The system as set forth in claim 1 wherein the inner bend is shaped as an arrow V.

14. The system as set forth in claim 1 and further including a second exterior component with an inner short leg and an outer short leg with a supplemental outer bend there between, the upper end of the outer short leg of the first mentioned exterior component and the upper end of the inner short leg of the second exterior component being integrally formed, the first mentioned exterior component and the second exterior component and the interior component and the lateral leg being in a common plane.

15. The system as set forth in claim 1 wherein an upper bend couples the inner short leg and the outer long leg and is located at an elevation below the lateral leg.

16. The system as set forth in claim 1 wherein an upper bend couples the inner short leg and the outer long leg and is located at an elevation above the lateral leg.

17. A tank hose handling system for use with a tank of the type having an enlarged cylindrical lower section and a small tubular upper section with a hemispherical middle section there between, and also for use with a gas dispensing hose of the type having an inner end attachable to an upper section and an outer free end, the system including:

a support assembly having an interior component with an inner long leg and an outer long leg with an inner bend there between, the support assembly also has an exterior component with an inner short leg and an outer short leg with an outer lower bend there between, and a lateral leg integrally formed with the upper end of the inner long leg and with a remote end and an outer curvature, wherein the lateral leg, remote end and outer curvature are movably couplable to the tubular upper section adjacent to the semi-hemispherical section.

18. The system as set forth in claim 17 and further including a third short leg and a fourth short leg with a second outer lower bend there between, the third and fourth short legs and second outer lower bend located outwardly of the outer short leg and parallel therewith and an upper outer bend securing the outer short leg to the third short leg.

19. The system as set forth in claim 18 wherein the upper outer bend and its legs are parallel with, but offset from, the inner bend and its legs and the outer lower bend and second outer lower bend along with their legs are at angles with respect to the upper outer bend and positioned there between.

20. A tank hose handling system for supporting a hose and associated components in operative proximity to a gas tank in a safe and convenient manner comprising, in combination:

a tank for containing and dispensing gas, the tank having an enlarged cylindrical lower section and a small tubular upper section with a hemispherical middle section there between and with a common vertical axis there through;

a gas dispensing hose having an inner end attached to the upper section and an outer free end with a plurality of operational components;

a support assembly having an interior component with an inner leg and an outer long leg with an inner bend there between, the support assembly also having an exterior component with an inner short leg and an outer short leg with an outer bend there between, the upper end of the outer long leg and the upper end of the inner short leg being integrally formed, the support assembly also having lateral leg integrally formed with the upper end of the inner long leg and an outer curvature removably coupled to the tubular upper section adjacent to the semi-hemispherical section, the support assembly being formed from a single piece of material formed to the desired shape and of a material thickness to allow for limited flexibility, the exterior component and the interior component and the lateral leg as well as the axis of the tank being in a common plane; and a lower strap encompassing the inner long leg adjacent to the bottom thereof and the cylindrical lower section adjacent to the lower extent.

* * * * *